Feb. 17, 1925.

F. E. HUGHEY

INSTRUCTION SET

Filed Oct. 10, 1921

Witness:
Geo. C. Dixon

Inventor
Fannie E. Hughey
By Ira J. Wilson Atty.

Patented Feb. 17, 1925.

1,526,547

UNITED STATES PATENT OFFICE.

FANNIE E. HUGHEY, OF CHICAGO, ILLINOIS.

INSTRUCTION SET.

Application filed October 10, 1921. Serial No. 506,666.

*To all whom it may concern:*

Be it known that I, FANNIE E. HUGHEY, a citizen of the United States, residing at Chicago, in the county of Cook and State of Illinois, have invented certain new and useful Improvements in Instruction Sets, of which the following is a specification.

This invention relates to apparatus for teaching music and more particularly to apparatus for teaching music to young children by the aid of colors and colored objects. It is a purpose of the invention to provide means for teaching music by using distinctive colors to represent the different tones in a musical scale, so that a child will associate the color with the particular note that it represents.

It is a further object of the invention to provide means whereby the child will be aided in learning what color is used to represent a certain note, by using pictures of objects with which the child is familiar in colors that are being used, said pictures being preferably of birds, whereby the analogy of a bird's note and the tone to be learned is maintained and the interest of the child is stimulated in a similar way to that now used in other kindergarten work.

It is a further purpose of the invention to provide apparatus for teaching music comprising colored markers to be used in combination with the keyboard of a piano or a chart representing such a keyboard, and colored pictures, preferably of birds, which are of the same colors as said markers, said pictures being used for the purpose of teaching the child the musical tone which the color of each picture signifies and said markers being used for the purpose of identifying the keys of the piano corresponding to said colors and said tones.

It is still another purpose of the invention to provide a chart comprising a representation of a keyboard of a piano and a musical staff and in combination therewith a plurality of colored markers to be placed in said chart, said markers being made in various colors corresponding to the notes that they represent, said markers being both in the form of disk-like stickers or labels and thumb-tacks with colored heads.

It is still another purpose of the invention to provide means for teaching children the duration of tones by providing a plurality of colored strips of the various colors referred to above, of various lengths, representing whole notes or fractions thereof, said strips being used in combination with a chart indicating the division of the music into measures and with pictures of the birds in the corresponding colors representing the various tones.

It is a particular purpose of the invention to provide thumb tacks of the mentioned character with members having openings therethrough for receiving the shank of the tack, and carrying hooks upon which may be hung cards bearing pictures in the colors corresponding to the colors of the heads of the tacks and cards having colored disks thereon of corresponding colors for familiarizing the pupils with the various ways of representing the tones by said colors.

Other objects and advantages of the invention will appear as the description of the accompanying drawings proceeds. However, I desire to have it distinctly understood that I do not intend to limit myself to the exact details shown in the drawings and described in the specification, but that I intend to include as part of my invention all such obvious changes and modifications of parts as would occur to a person skilled in this art and as would fall within the scope of the claims.

In the drawings:

Fig. 9 is a perspective view of the hook employed for hanging a card on one of the thumb-tacks.

Figure 1:
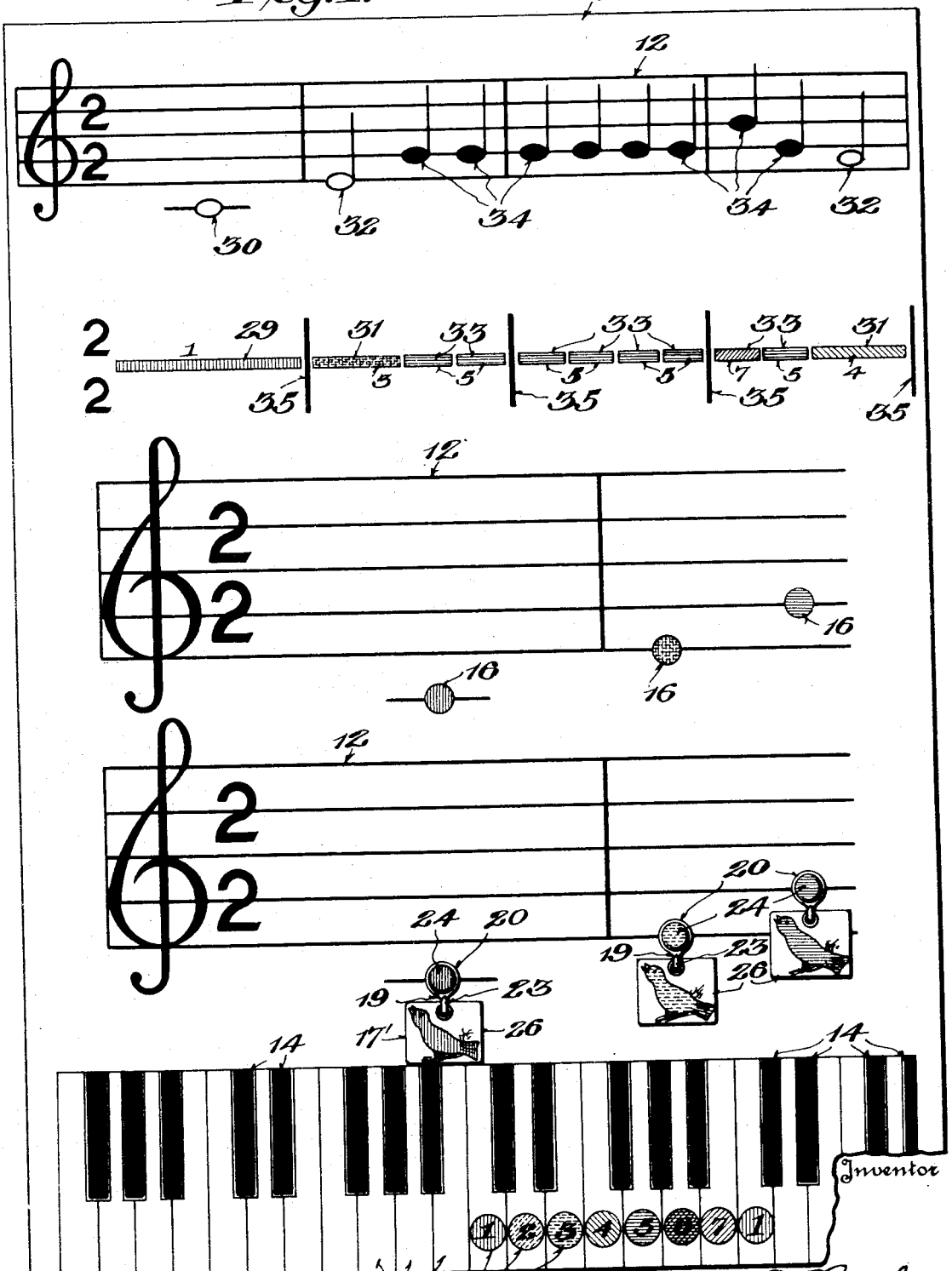
Fig. 1 is a plan view of a chart embodying the features of the present invention.
Figure 8:
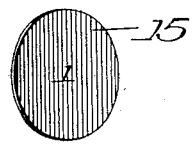
Fig. 8 is a perspective view of a gummed disk used in conjunction with a piano keyboard as shown in the chart in Fig. 1.

Referring in detail to the drawings the improved apparatus for teaching music with the aid of colors comprises a chart 11 of any suitable material, preferably of sufficient thickness and penetrability that a thumb-tack may be fastened into the same. Upon this chart is printed or otherwise provided thereon a plurality of musical staffs 12 and a representation of a piano keyboard comprising the white keys 13 and the black keys 14. In conjunction therewith is used a plurality of colored disks 15 shown in perspective in Fig. 8. The disks 15 are provided with suitable adhesive for securing the same to the keys of a piano or a representation of a piano keyboard as shown in Fig. 1. The disks which constitute key markers are of different colors, each note of the scale having a particular color assigned thereto.

Figure 2:
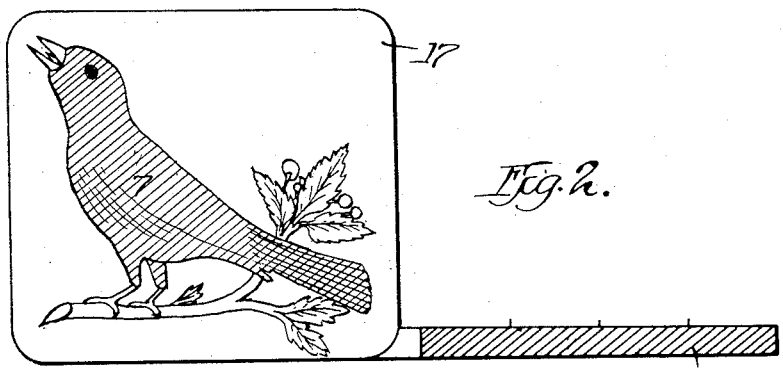
Fig. 2 is a plan view of a card having the picture of a bird and a pitch and duration strip of the same color used in conjunction therewith.
Figure 4:
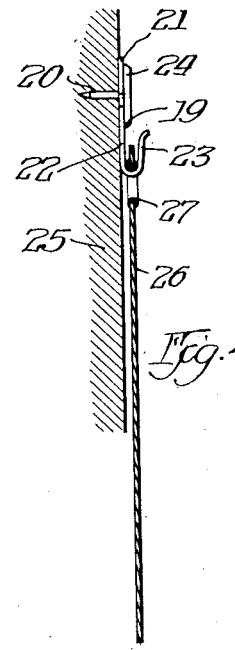
Fig. 4 is a fragmentary view showing a thumb-tack secured in a support and having a hook carrying member mounted thereon, said hook carrying member having a card mounted thereon.
Figure 7:
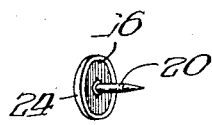
Fig. 7 is a perspective view of a thumb-tack without the hook attachment.
Figure 5:
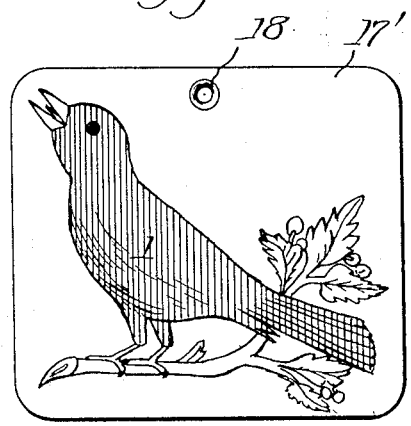
Fig. 5 is a plan view of one form of card that may be attached to the hook.

The thumb-tack 16 shown in perspective in Fig. 7 are also used in conjunction with the chart, said thumb tacks being used to mark the lines on the staff or the spaces between said lines to correspond with the marking of the keys on the keyboard on said chart or on a piano. That is to say, the thumb-tacks are provided with colored heads corresponding to the colors of the disks used to mark the keys, the disk numbered 1 in Fig. 1 being the same color as the head of the thumb-tack numbered 1 in said Figure, and the disk and thumb-tack numbered 3 in said figure being the same color and so on. In conjunction with the chart, the thumb-tacks with the colored heads and the colored disks, are used cards 17 bearing pictures of birds in colors corresponding to the colors of the disks and thumb-tacks. One of said cards is shown in Fig. 2 and is shown as having a bird thereon of the color corresponding to that of the first note of the scale as represented by the disks and thumb-tacks. The card may be made as shown at 17' in Fig. 5, in which figure the card is shown as being provided with an eyelet 18 so that the same may be hung up if desired. In order to associate the color on the thumb-tack head with the colored picture of the bird suitable means is provided for bringing the same in close proximity before the eyes of the child, said means comprising a hook 19 which is adapted to be hung from the shank 20 of the thumb-tack 16. The hook is preferably provided with an enlargement at 21 having an opening for receiving the shank of the thumb-tack and with a depending portion 22 terminating in a hook 23. As will be clear from Fig. 4 the hook member is mounted on the shank of the thumb-tack between the head 24 thereof and a suitable support 25 for receiving the thumb-tack.

In order to bring the colors of the key markers more clearly before the minds of the students a card 26 having an eyelet 27 and provided with a representation of a colored disk 28 corresponding in color to one of the key markers is provided, said card being capable of being hung on the tack 16 in a similar manner to the card 17'.

The above mentioned apparatus merely teaches the pitch of the various notes of the scale without teaching their relative duration, and in order to teach this other apparatus is used in conjunction with the above mentioned devices, said apparatus comprising a plurality of colored strips corresponding in color to the colors used to represent the various notes indicated by the disks, birds and thumb-tacks. The strips are of various lengths to represent the various length notes such as whole notes, half notes and quarters. The strips are shown in Fig. 1 and a strip 29 is shown representing the whole note shown at 30 in Fig. 1, said strip being of the proper color to represent said note. Similarly the strips 31 which are half as long as the strips 29 represent the half notes 32 and the strips 33 represent the quarter notes 34 and are one-fourth as long as the strips 29. These strips are used in conjunction with a chart marked off in measures by means of the divisional markings 35.

Figure 3:
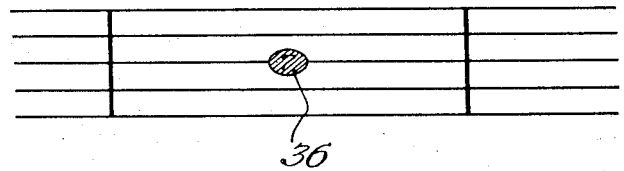
Fig. 3 is a view of a staff showing conventionally thereon the note represented in Fig. 2 by the picture of the bird and the colored strip.

In Fig. 2 is shown a card 17 having a picture of a bird thereon of the color representing the note shown at 36 in Fig. 3 and a strip 29 of the same color as the picture of the bird, said card being movable longitudinally of the strip to graphically illustrate the length of the note representd at 36.

The apparatus is used in the following manner: The student, a young child, is first shown the picture of the bird representing the first note of the scale, this note being in the key of C major middle C. The color of this bird is preferably red, although other colors may be used without departing from the spirit of the invention. The preferred way to use the picture is to show the child the picture and tell it that the red bird sings "do" sounding the note vocally at this time. After the child has learned to associate the picture of the red bird with the tone "do" then the colored disk 15 may be placed on the piano keyboard or the representation thereof at 1 and the analogy of the bird carried out by telling the child that the particular key is the nest for the red bird. In a similar manner the fifth note may be represented by the color blue and learned in a similar manner, and then the third note, the second note, the fourth note and finally the sixth, seventh and eighth, each being represented by distinctive colors.

Figure 6:
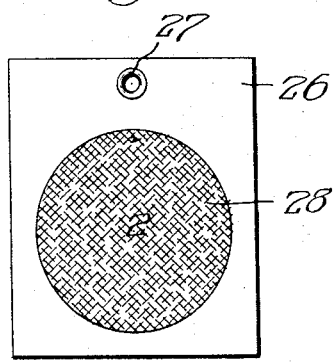
Fig. 6 is a similar view of another form of card that may be similarly attached.

After the notes are learned in the manner outlined the position thereof on the staff as well as on the piano keyboard is learned by placing the thumb-tacks with the heads of the proper colors in the positions that said notes would occupy on the staff. The analogy between the colors and birds of the same colors may be carried out by referring to the lines and spaces on the staff as rails on a fence upon which the birds may perch. As previously stated the colors on the heads of the tacks, on the disks and of the birds may be so placed as to be readily associated with each other by using the colored headed thumb-tacks with the hooks as shown in Fig. 6.

Then the lengths of the various notes are learned by means of the colored strips. The colored strips can be readily compared in length by superposition or by being placed parallel to each other and the number of notes of the various lengths in a measure can be readily illustrated by the means shown in Fig. 1. In Fig. 1, the same notes are represented by the colored strips as are shown in the ordinary manner at the top of the chart in Fig. 1, the strips being of the colors corresponding to the positions of the notes in the scale and the lengths thereof corresponding to the duration of the various notes shown. The duration of the various notes can be graphically illustrated by means shown in Fig. 2, in which the card 17 can be drawn from left to right at a uniform speed along the strip to illustrate the duration of a whole note and similarly by means of fraction length strips the duration of half and quarter notes.

It will thus be seen that the apparatus described teaches the association of a color with a tone, the position of the tone on the piano keyboard and on a musical staff and the duration of the various notes.

Having thus described my invention, what I desire to claim and secure by United States Letters Patent is:

I claim:

1. A music instruction set comprising, a chart body having thereon the representations of a keyboard and a music staff, in combination with a series of key-markers for applying to the key representations on the chart body, each key marker differing in color from each of the other key markers, sets of musical-pitch markers corresponding in colors to the key-markers and for applying to the lines and spaces of the staff on the chart, sets of devices having thereon pictorial representations corresponding in colors to the musical pitch markers for application to the chart body, and sets of combined pitch and duration markers corresponding in number and colors to the note pitch markers for application to the chart, each set of combined pitch and duration markers including a series of markers progressively and regularly increasing in size to indicate standard note durations.

2. A music instruction set, comprising a chart body having thereon the representations of a keyboard and a music staff, in combination with a series of key-markers for applying to the key representations on the chart body, each key marker differing in color from each of the other key markers, sets of push pins constituting musical pitch-markers and corresponding in colors to the key-markers and for application to the lines and spaces of the staff on the chart, a plurality of hooks having eyes to detachably receive the shanks of push pins to hang the hooks thereon, sets of devices having thereon pictorial representations corresponding in colors to the musical pitch-markers and provided with eyes to receive respective hooks for hanging the pictorial representations on the chart, and sets of combined pitch and duration markers corresponding in colors to the musical pitch-markers for application to the chart, each set of combined pitch and duration markers including a series of markers progressively and regularly increasing in size to indicate standard note durations.

FANNIE E. HUGHEY.